United States Patent [19]
Saitta, Jr.

[11] Patent Number: 5,645,238
[45] Date of Patent: Jul. 8, 1997

[54] FISHING REEL

[76] Inventor: George N. Saitta, Jr., 17911 Denvale Cir., Huntington Beach, Calif. 92649

[21] Appl. No.: 482,496

[22] Filed: Jun. 7, 1995

[51] Int. Cl.[6] .................................. A01K 89/015
[52] U.S. Cl. ..................... 242/264; 242/268; 242/302
[58] Field of Search .................... 464/902, 150, 464/152; 242/246, 268, 269, 270, 271, 267, 264, 302

[56] References Cited

U.S. PATENT DOCUMENTS

| | | | |
|---|---|---|---|
| 3,000,477 | 9/1961 | Dunn | 242/270 |
| 3,144,217 | 8/1964 | Wood, Jr. | 242/246 |
| 3,322,369 | 5/1967 | Haenelt, Jr. | 242/246 |
| 4,907,759 | 3/1990 | Takeuchi et al. | 242/246 |
| 5,007,602 | 4/1991 | Carlsson | 242/246 |
| 5,411,218 | 5/1995 | Uehara et al. | 242/246 |

*Primary Examiner*—Katherine Matecki
*Attorney, Agent, or Firm*—J. Mark Holland & Associates

[57] ABSTRACT

An apparatus for exerting a drag force on a main gear within an assembly such as a fishing reel includes bearing means subject to selective amounts compressive force. Adjustable compressing means imposes compressive force on the bearing means, which force is translated into drag force on the main gear by linkage means between the bearing means and the main gear means. The bearing means may include a plurality of bearings mounted in a race, and may include a plurality of such races. The linkage means may include a plurality of washers selectively engaged with the main gear or with a sleeve about which the bearing means is mounted. Wear-resistant material may be operably disposed between two or more of the main gear, the plurality of washers, and the one or more bearing means.

12 Claims, 3 Drawing Sheets

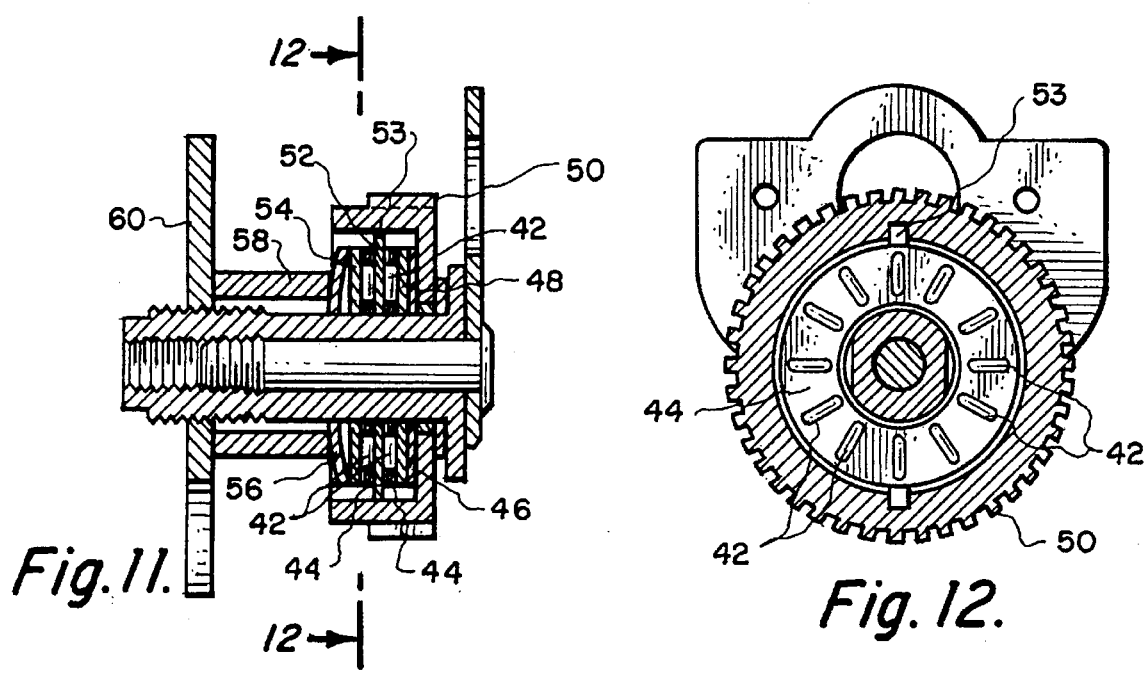

FISHING REEL

BACKGROUND OF THE INVENTION:

This invention relates to an apparatus for exerting a drag force on a main gear and, more particularly, to an assembly such as a fishing reel which incorporates such an apparatus. The apparatus of my invention utilizes bearings under compressive force to aid in producing the drag force.

In the fishing reel industry, it is known to provide a drag mechanism on a reel. A representative example of such prior art reel and drag mechanisms is included in an exploded view in the Penn™ Reels Parts and Price List for Model 114-114H-114L-115L. Typically, reel assemblies include handles which may be rotated in only one direction. That rotation winds the fishing line onto a spool member. A spring actuated dog or ratchet engages a gear that is operably connected to the handle to ensure that the handle rotates the reel in only that one direction. To east the line, a clutch is provided to disengage the spool member so that it can rotate independently of the handle.

Drag mechanisms are useful in such fishing reel assemblies for several purposes. Among other things, drag mechanisms can be set to "give" at a selected tension in the fishing line. This helps ensure that when a fish is hooked and fighting the fisherman or there is otherwise a selected amount of tension in the line, the spool will turn and permit the line to feed from the spool instead of breaking. In addition, during such times, the drag mechanism ensures that the feeding of the line is against some selected amount of frictional force, so that a running fish will tend to become tired after some amount of pulling on (and even running with) the line.

Conventional drag mechanisms utilize a bridge or frame member associated with the spool member (onto which the fishing line is wound), and a post member mounted on the frame member. Many of the operative components of the drag mechanism are coaxial with respect to the longitudinal axis of the post member. For example, a sleeve member is rotatably mounted coaxially on the post member, a main gear is rotatably coaxially mounted on the sleeve member, and the handle is coaxially threaded into the end of the sleeve member.

In addition, to slippably link the rotation of the handle to cause rotation of the spool, a linkage is provided. Typically, this linkage includes keying the sleeve member 116, prior art FIGS. 1–3 (by providing one or more flat portions 117 on the outer surface), keying the interior of the main gear 118 (by providing one or more channels 119 therein), and coaxially mounting one or more keyed and cared washers 134 and 152 on the sleeve member. The keyed washers 134 are correspondingly shaped to engage the keyed sleeve member 116 and the cared washers 152 include ears 153 which correspondingly engage the channels 119 in the interior of the main gear 118. The keyed washers 134 thereby rotate with the bridge sleeve member 116, and the cared washers 152 rotate with the main gear 118.

An adjustable wheel 128, prior art FIG. 1, is coaxially threaded on the outside of the sleeve 116 so that it can be tightened to exert a compressing force on the stack of washers. If the compressing force is sufficiently small or non-existent, the washers spin freely with respect to each other and the main gear can rotate independently of the sleeve. In this condition, rotating the handle causes the sleeve and its keyed washers to rotate, but there is relatively no engagement between the keyed washers and the cared washers, so the main gear (and the spool engaged therewith) are not correspondingly rotated.

If the adjustable wheel is sufficiently tightened, however, the various washers are compressed against each other. The compression causes a frictional force between the washers, and so long as that frictional force is not overcome by tension on the fishing line, the washers remained "engaged" with adjacent washers and transmit the rotation of the handle and sleeve to the main gear and spool. The amount of frictional force is proportional to the amount of compressive force exerted by the adjustable wheel mechanism. In other words, the greater the compressive force, the greater the frictional force acting between the washers, and the greater the tension on the fishing line must be to overcome that frictional force and permit the spool to turn more freely and the fish to "run".

Thus, the adjustable wheel must be tightened sufficiently so that, when a fisherman rotates the handle, the spool turns and the fishing line is wound onto it. It must be sufficiently loose, however, that tension on the line will overcome the friction between the washers before overcoming the strength of the line (overcoming the strength of the line typically results in the line breaking and the fish getting away). The adjustable means commonly permits adjustment of this frictional force at virtually any time, including while a fish is on the line. Thus, the amount of drag force on the line can be adjusted according to the size, strength, and energy of the fish at any given time, as well as according to the strength of the fishing line being used.

Thus, when the frictional force is overcome, the washers spin beside each other. This spinning under sometimes substantial friction causes wear to occur to the contacting surfaces. Rather than have the washers and/or the main gear wear each other during such spinning, prior art fishing reel assemblies commonly place between the washers washer-shaped discs 146, prior art FIG. 1. Common brands of these discs are HT-100® (HT-100 is a registered trademark of PENN™) or SUPER SMOOTHIES™. These materials are relatively tough and therefore last for a not insubstantial amount of time before needing to be replaced.

Despite their usefulness, the prior art fishing reels of the type just described have numerous shortcomings. Among other things, the initial slippage of the main gear from the sleeve (via the washers and the HT-100® discs 146) can be rather abrupt and sudden instead of more smooth and gradual. Such abrupt and sudden slippage (such as when a fish "hits" the line) can cause unnecessary damage or breakage to the fishing line and/or unnecessary wear on the entire fishing reel assembly and the fisherman. This transition across the drag threshold can be rather jerky, and repeated jerking of this type can overstress the fishing line (the jerks act as cyclic loading on the line, prematurely stretching, hardening, and tiring the line and leading to its eventual breakage).

In addition, in prior art devices, the HT-100® discs 146 need to be replaced at relatively frequent intervals of usage, due to the aforedescribed frictional wear.

Also, the range of drag force achievable from a given configuration of washers and HT-100® discs 146 is relatively limited. When fishermen want more drag than they can get with hand-tightening a prior art assembly, they sometimes resort to using tools to twist the adjustable wheel past hand-tight. This can damage the threads and other components of the assemblies, and even cause them to fail. Although increases in drag force can be achieved by adding additional washers and HT-100® discs, a common limit of drag force achievable with prior art fishing reels is 26–28 pounds.

OBJECTS AND ADVANTAGES OF THE INVENTION:

It is, therefore, an object of my invention to provide a drag mechanism useful, for example, in devices such as the abovedescribed fishing reel assembly, which mechanism has improved longevity as well as smoother transition from a static condition to a dragging condition than is available in prior art devices. As indicated above, some benefits from such an improved device include reduced stress and reduced wear and tear on the fishing line, the reel components, and the fisherman, resulting in a higher percentage of fish landed.

Another object of my invention is the provision of a drag mechanism which can provide greater drag force than comparable prior art devices.

An additional object of my invention is the provision of a fishing reel apparatus of the aforementioned character, which includes the combination of reel means for selectively collecting, storing and releasing fishing line, and drag means for exerting a drag force on the fishing line in opposition to the line being pulled from the reel means. In the device of my invention, the drag means includes one or more bearings operatively engaged with the reel means, and further includes compressing means for exerting compressive force on the one or more bearings. Linkage means converts the compressive force on the one or more bearings into the drag force on the fishing line. The drag means may include a plurality of bearings mounted in a race, and/or a plurality of such races operatively assembled into a single reel assembly.

A further object of my invention is the provision of an apparatus of the aforementioned character, further including a post member in operative relationship with the reel means. The post member has a longitudinal axis, and the drag means includes a plurality of bearings disposed radially about the post member in a plane normal to the longitudinal axis.

An additional object of my invention is the provision of an apparatus of the aforementioned character, in which the linkage means includes a main gear coaxially mounted on the post member and rotatable thereon and engaged with the reel means, and the one or more bearings are compressed against the main gear by the compressing means. The compressing means preferably includes adjustment means for adjusting the compressive force on the one or more bearings.

Yet another object of my invention is the provision of an apparatus of the aforementioned character, in which the adjustment means includes a sleeve member rotatably mounted and retained on the post member, with a one or more bearings disposed radially about the sleeve member, and the adjustment means further includes an adjustment wheel threadedly engaged with the sleeve member. In this embodiment, means is provided for translating rotation of the adjustment wheel with respect to the sleeve member into an adjustment of the compressive force on the one or more bearings.

A further object of my invention is the provision of an apparatus of the aforementioned character, in which the linkage means includes a main gear coaxially mounted on the post member and rotatable thereon and engaged with the reel means, and the linkage means further includes a plurality of washers operatively and coaxially disposed about the post member and/or sleeve member, selected ones of the washers being operatively engaged with the main gear and other of the washers being operatively engaged with the sleeve member, and at least some of the one or more bearings disposed between the washers. In certain embodiments of my invention, the drag means further includes wear-resistant material such as the discs 146 described above (although I prefer KEVLAR® or TEFLON® discs (KEVLAR and TEFLON are registered trademarks of DuPont Corporation), operably disposed between two or more of the main gear, the plurality of washers, and the one or more bearings.

Yet another object of my invention is the provision of an apparatus for exerting a drag force on main gear means. The apparatus includes the combination of frame means having a post member disposed thereon; a sleeve member coaxially mounted and retained on the post member and rotatable thereon; main gear means coaxially mounted on the sleeve member and rotatable thereon; one or more bearing means radially disposed about the sleeve member and operatively linked to the main gear means, and compressing means for exerting compressive force on the bearing means. The operative linkage between the bearing means and the main gear means is configured to translate the compressive force on the bearing means into drag force on the main gear means. In a preferred embodiment, the linkage means further includes a plurality of washers operatively and coaxially disposed about the post member, with selected ones of the washers being operatively engaged with the main gear means and other of the washers being operatively engaged with the sleeve member, and at least some of the one or more bearing means disposed between the washers.

The drag force means of my invention is certainly useful in connection with fishing reel assemblies, as described herein, and may find usefulness in a broad range of other applications which will make themselves apparent to persons of ordinary skill in the art.

Other objects and advantages of the invention will be apparent from the following specification and the accompanying drawings, which are for the purpose of illustration only.

BRIEF DESCRIPTION OF THE DRAWINGS:

FIG. 11 is similar to FIG. 5, but illustrates yet another of the many alternative embodiments of the bearing means of the invention, including a plurality of races of bearings; and FIG. 12 is a transverse sectional view taken on the line 12—12 of FIG. 11.

Figure 4:
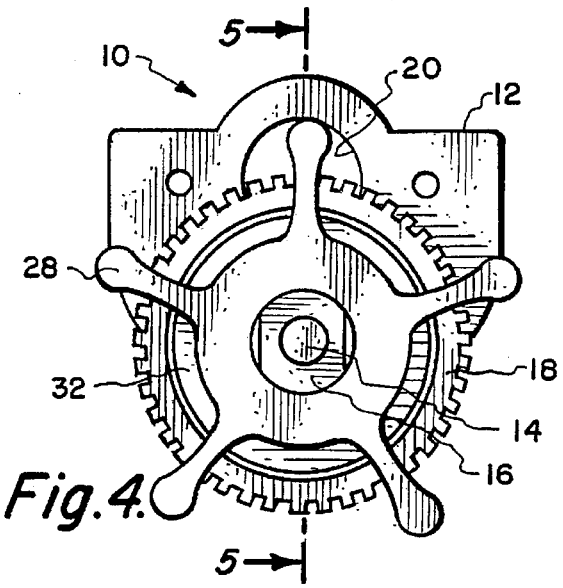
FIG. 4 is a side elevational view of a preferred embodiment of a drag apparatus constructed in accordance with the teachings of the invention.
Figure 5:
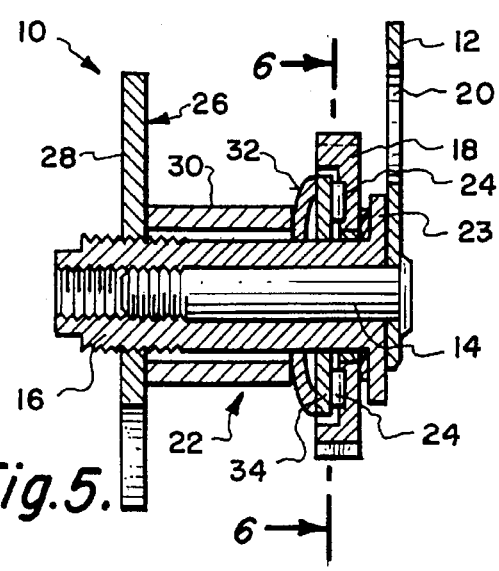
FIG. 5 is a transverse sectional view taken on the line 5—5 of FIG. 4.
Figure 6:
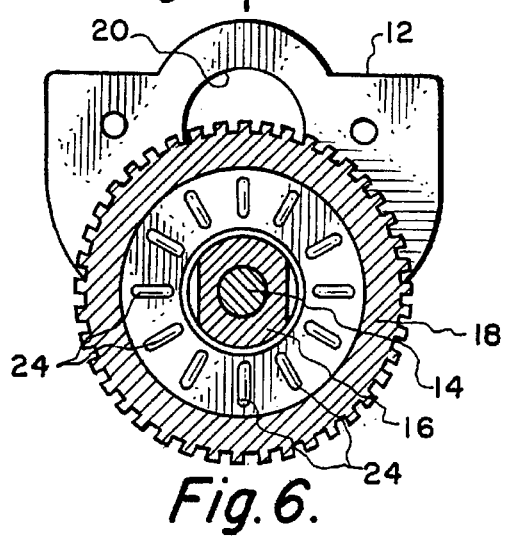
FIG. 6 is a transverse sectional view taken on the line 6—6 of FIG. 5.

DESCRIPTION OF PREFERRED EMBODIMENT:

Referring now to the drawings, and particularly to FIGS. 4–6 thereof, I show a preferred embodiment of my invention. In FIGS. 4 and 5, the drag apparatus 10 includes a frame member 12 having a post member 14 operatively affixed thereto. The post member 14 has a longitudinal axis about which many of the other components of the assembly are coaxially positioned and rotatable.

In the preferred embodiment, a sleeve member 16 is coaxially and rotatably positioned and retained on the post member 14. A main gear 18 is coaxially and rotatably positioned and retained on the sleeve member 16. The main gear operatively engages a pinion gear (not shown) associated with the spool or reel (not shown) onto which the fishing line (not shown) is wound. The pinion gear and spool are preferably mounted in an opening 20 on the frame means, and are positioned so that the teeth of the pinion gear engage the teeth of the main gear, and so that rotation of the pinion gear causes the spool to rotate.

Certain other features in the preferred embodiment which are common to the prior art and are therefore known to persons of ordinary skill in the art and are not illustrated in detail (or sometimes not at all) herein include a clutch by which the pinion gear can be disengaged from the main gear to permit the line to be cast, and a dog gear 23 affixed to or integrally formed with the sleeve member 16, which is engaged by a spring-actuated dog or ratchet assembly (not shown) to restrict the rotation of the sleeve member to a single direction (which direction results in the winding of the fishing line onto the spool).

Figure 3:
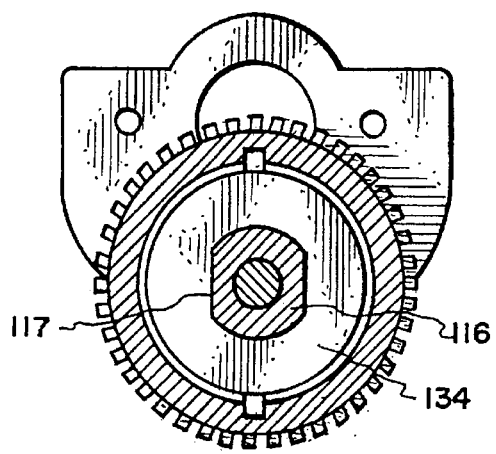
FIG. 3 is a transverse sectional view taken on the line 3—3 of FIG. 1.

The preferred embodiment of my invention also incorporates drag means 22 for exerting a drag force on the fishing line in opposition to the line being pulled from the reel means. The preferred drag means 22 includes one or more bearings 24 operatively engaged with the reel means (not shown). The preferred drag means 22 further includes compressing means 26 for exerting compressive force on the one or more bearings 24. In the preferred embodiment, the compressing means 26 is illustrated as including adjustment means 28 for adjusting the compressive force on the one or more bearings. The preferred adjustment means 28 is shown as an adjustment wheel threadedly engaged with the sleeve member 16. The compressing means 26 further includes means for translating rotation of the adjustment wheel 28 with respect to the sleeve member 16 into an adjustment of the compressive force on the one or more bearings 24. In the preferred embodiment, the means of translating this rotation of the adjustment wheel is illustrated as including a cylindrical sleeve 30, a tension spring or concave washer 32, and an eared washer 34 similar to eared washer 134 in prior art FIG. 3.

As persons of ordinary skill in the art can see from the figures, tightening the wheel 28 will force the sleeve 30 and the washers 32 and 34 into ever greater compression force onto the bearings 24. The greater the compression force on the bearings 24, the more rotational force is required to overcome the frictional forces existing when the main gear 18, the bearings 24 and the washer 34 are at rest with respect to each other.

As indicated above, the spool in my preferred embodiment is linked to the main gear 18 such that (in the absence of disengagement via an intermediate clutch member) the main gear 18 and the spool correspondingly rotate. As with prior art devices, so long as the tension on the fishing line does not exceed the resisting frictional force resulting from the compressing force on the bearings 24, the spool and main gear 18 will be "engaged" with the sleeve 16. Once that frictional force threshold is exceeded (by a fish hitting the line, etc.), the bearings 24 rotate, permitting the main gear 18 and the spool to rotate without corresponding rotation of the sleeve 16.

Figure 2:
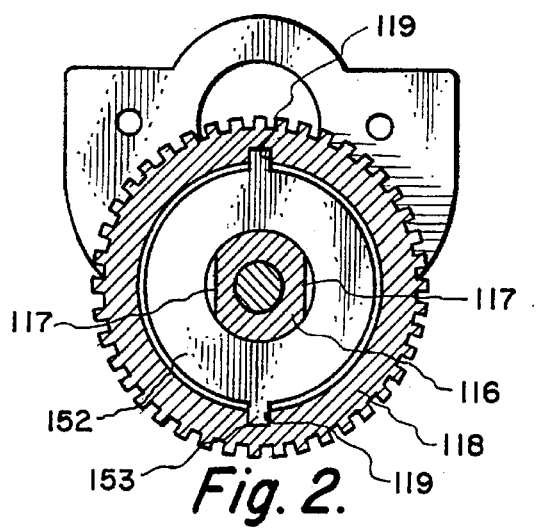
FIG. 2 is a transverse sectional view taken on the line 2—2 of FIG. 1.

In the alternative embodiment of FIGS. 11 and 12, the bearing means 42 are operably mounted in a race 44. In FIG. 11, a cushion washer 46 of KEVLAR®, HT-100®, TEFLON® or other similar material may be placed against the contact surface of the main gear under a keyed washer 48 (similar to keyed washer 134 in prior art FIG. 3) to avoid direct wear on main gear 50. In assembling the device of FIG. 11, a race 44 of bearings 42 is placed adjacent the keyed washer 48, followed by an eared washer 52 having ears 53 (similar to eared washer 152 having ears 153 in prior art FIG. 2), followed by another race 44 of bearings 42, followed by another keyed washer 54 (similar to keyed washer 134 in prior art FIG. 3), finally followed by a tension spring or concave washer 56, spacer sleeve 58, and tightening wheel 60.

Additional bearing races can be added in other embodiments of my invention, in which case corresponding additional eared and keyed washers would also preferably be included (to provide each race with the desired surfaces on which its bearings could rotate).

Persons of ordinary skill in the art will understand that the preferred post member 14 of my invention has a longitudinal axis extending normally in and out of the page of FIG. 6, and that the preferred drag means includes a plurality of bearings disposed radially about the post member in a plane normal to the longitudinal axis. In other words, as illustrated in FIG. 6, the plurality of bearings disposed radially about the post member lie in the plane of the page.

Figure 1:
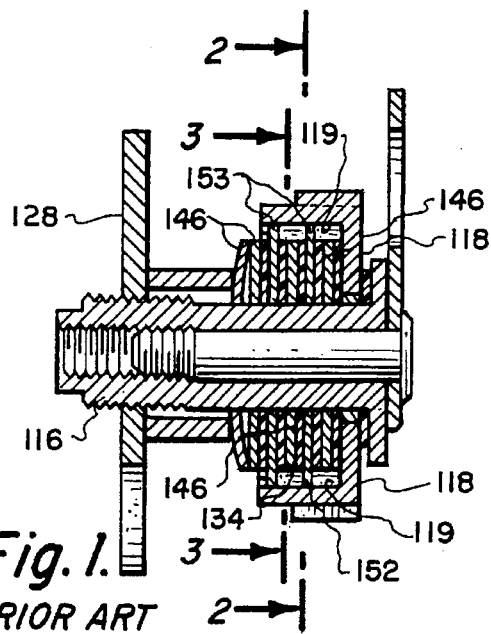
FIG. 1 is a sectional elevational view of a prior art drag apparatus.
Figure 8:
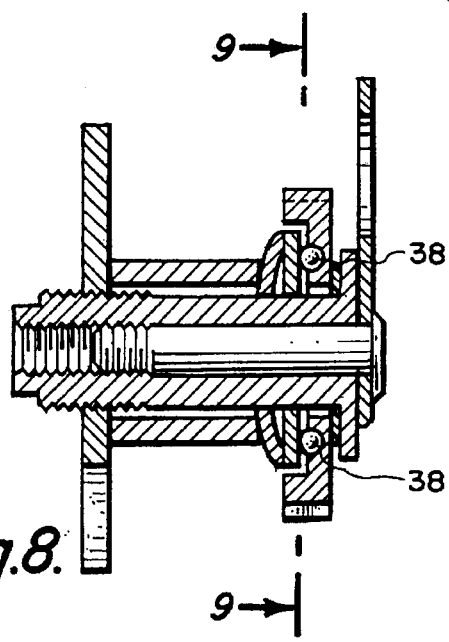
FIG. 8 is similar to FIG. 5, but illustrates another of the many alternative embodiments of the bearing means of the invention.

Persons of ordinary skill in the art will also understand that, by moving or extending the threads on which the wheel 28 is engaged toward the tension spring 32, the collar or spacer sleeve 30 can be reduced in length or even eliminated. This is so, in part, because my invention can provide the same or greater drag force as prior art devices, from a "stack" of components much shorter along the longitudinal axis of the post member than comparable prior art devices. This is illustrated by a comparison of the distance between the tension spring and main gear of prior art FIG. 1 to the distance between the corresponding components of my invention as illustrated in FIGS. 5, 8, or 11. Thus, in certain embodiments, the post 14, the sleeve 16, the main gear 18, and the collar or spacer sleeve 30 of my invention may be reduced in length from the lengths shown in the drawings, and thereby reduce the weight and cost of fishing reels in comparison to prior art assemblies.

Prior art main gears are also typically fabricated from brass. This is typically too soft a material to satisfactorily withstand the frictional forces exerted by the bearing members of my invention. Accordingly, where the bearings 24 are seated directly into the main gear 18 (such as in FIGS. 4–10), the main gear 18 is preferably fabricated from a harder materials such as stainless steel (330 or 440 stainless is exemplary, but not delimiting, of acceptable materials in this regard). Alternatively, a hardened surface may be brazed onto the bearing surface of the main gear, or a cushion washer of KEVLAR®, HT-100®, TEFLON® or other similar tough material may be placed against the contact surface of the main gear (see cushion washer 46 in FIG. 11, for example) under another washer to avoid excessive wear on the main gear surface.

Similar wear considerations dictate that, for washers or other metal components in contact with the bearing means of my invention, the contacting surfaces or the entire component should preferably be provided from a hardened metal or similar material.

Such a cushion washer provides additional benefits, in that it ensures a more complete area of compressive contact than if no cushion washer is utilized. Among the benefits is a smoother drag performance, because the effect of high spots between the contacting washer and the inside contacting surface of the main gear are reduced or eliminated.

Figure 7:
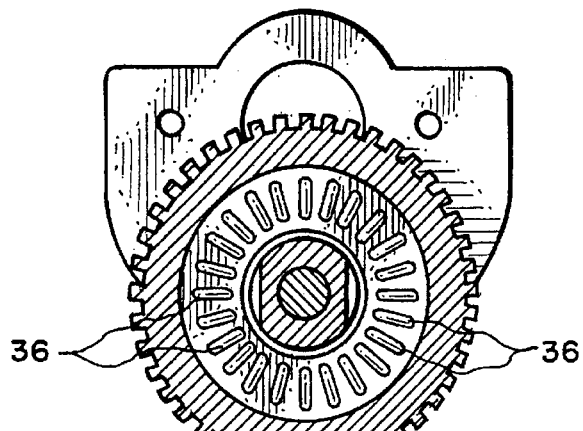
FIG. 7 is similar to FIG. 6, but illustrates one of the many alternative embodiments of the bearing means of the invention.
Figure 9:
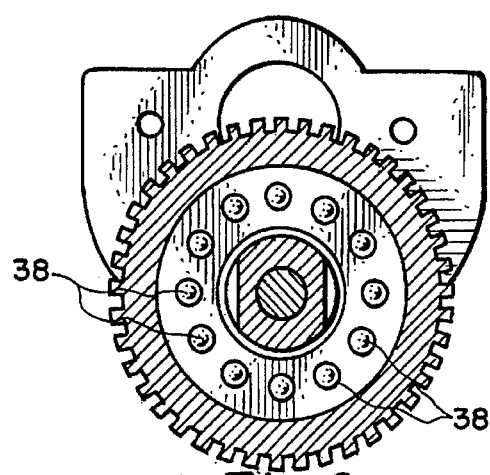
FIG. 9 is a transverse sectional view taken on the line 9—9 of FIG. 8.
Figure 10:
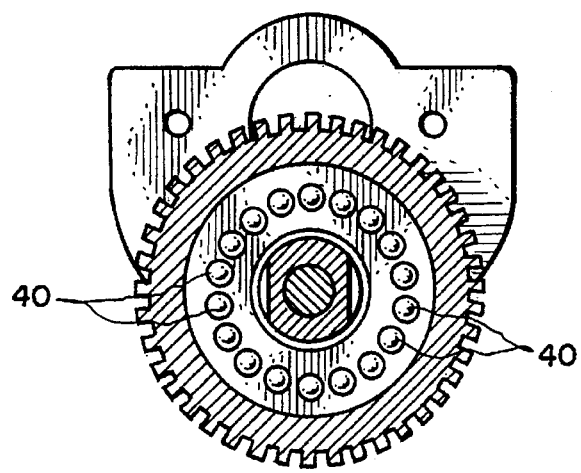
FIG. 10 is similar to FIG. 9, but illustrates one of the many alternative embodiments of the bearing means of the invention.

The number, size, shape and location of the bearing means 24 of my invention can be any of a wide variety. By way of example and not by way of limitation, FIGS. 7–10 illustrate some of the many alternative embodiments of the bearing means of my invention. FIG. 7 illustrates roller bearings 36 in a more dense configuration than those shown in FIG. 6. FIGS. 8–9 show the use of ball bearings 38 in a pattern similar to that of the roller bearings 24 of FIG. 6. In FIG. 10, a more dense pattern of ball bearings 40 is illustrated.

Persons of ordinary skill in the art will understand that, even where the apparatus is configured to receive a plurality of bearings, some of the bearings may selectively be omitted, thereby adjusting the drag characteristics of the assembly.

To reduce the wear on the bearing means of my invention, the bearings are preferably packed in a high-temperature grease or other lubricant. One such lubricant which has been found to be satisfactory is UNIVERSAL BLUE GREASE™. Due to the high temperatures that can be generated within the drag means of my invention, regular grease (that is, grease not designed for use at high temperatures) has been found to be unsatisfactory, as it quickly becomes non-lubricating during use. In effect, regular grease has quickly turned into a clay-like substance.

In my invention, a preferable assembly includes a thin to moderate coating or layer of grease on all bearing surfaces (including washers, bearings, and bearing races).

Most prior art drag mechanisms are assembled with no grease. An exception is the DAIWA™ SLSH Series, which incorporates a wet drag system for smaller reels. In this DAIWA™ system, TEFLON®-based grease is applied to a soft washer such as a felt washer, and the keyed and eared washers frictionally rub against the greased felt washers. Most other prior art systems rely instead on the friction components remaining dry and ungreased. If these other prior art friction components were greased (as the bearings of my invention are greased), the prior art drag mechanisms would provide no friction or at most a greatly reduced amount of friction.

With respect to fishing reel assemblies, the amount of drag force that my invention can produce is substantially greater than conventional drag mechanisms. With two races of bearings, for example, prototypes of my invention have been hand-tightened to produce 36–37 pounds of drag. A prototype using only one race did not provide as much drag, but was still an improvement over prior art devices. Such single race embodiments may be useful, for example, in smaller reels such as bait-casting reels or spinning reels.

Except as noted above, the materials for my invention are preferably similar to those of prior art drag systems. Persons of ordinary skill in the art will understand that a wide variety of materials and components (including shape and proportional sizes) can be effectively utilized without departing from the scope of my invention.

Another of the many embodiments of a fishing reel using my drag mechanism is modification of a prior art lever drag reel assembly (not shown). In such assemblies, a lever is provided adjacent the spool, and the drag on the spool is increased by applying force to the lever. Bearing means of my invention may be positioned in the linkage between the lever and the spool to provide the benefits discussed above.

In addition to fishing reel drag mechanisms, the apparatus of my invention is useful to provide drag for other mechanisms. Among other things, it may be readily modified to provide drag for the sometimes used to raise and lower windows within their frames. Virtually any application requiring drag could potentially utilize the teachings of my invention.

Thus, by my invention, I provide an improved drag means useful, among other things, in connection with a fishing reel assembly. The apparatus of my invention has been described with some particularity, but the specific designs and constructions disclosed are not to be taken as delimiting of the invention in that various modifications will at once make themselves apparent to those of ordinary skill in the art, all of which will not depart from the essence of the invention and all such changes and modifications are intended to be encompassed within the appended claims.

I claim:

1. In a fishing reel apparatus, the combination of: reel means for selectively collecting, storing, and releasing fishing line; drag means for exerting a drag force on the fishing line in opposition to the line being pulled from said reel means, said drag means including a post member having a longitudinal axis, said drag means further including at least one bearing disposed radially about said post member in a plane normal to said longitudinal axis, said drag means further including compressing means for exerting compressive force on said at least one bearing, said drag means further including linkage means for converting said compressive force on said at least one bearing into said drag force on the fishing line.

2. The apparatus of claim 1, in which said drag means includes a plurality of bearings.

3. The apparatus of claim 1, in which said drag means includes a plurality of said bearings mounted in a race.

4. The apparatus of claim 3, in which said drag means includes a plurality of said races.

5. The apparatus of claim 1 or claim 2 or claim 3 or claim 4, in which said linkage means includes a main gear coaxially mounted on said post member and rotatable thereon and engaged with said reel means, and said at least one bearing is compressed against said main gear by said compressing means.

6. The apparatus of claim 1 or claim 2 or claim 3 or claim 4, in which said compressing means includes adjustment means for adjusting the compressive force on said at least one bearing.

7. The apparatus of claim 6, in which said adjustment means includes a sleeve member rotatably mounted and retained on said post member, said at least one bearing being disposed radially about said sleeve member, said adjustment means further including an adjustment wheel threadedly engaged with said sleeve member, and means for translating rotation of said adjustment wheel with respect to said sleeve member into an adjustment of the compressive force on said at least one bearing.

8. The apparatus of claim 7, in which said linkage means includes a main gear coaxially mounted on said post member and rotatable thereon and engaged with said reel means, and said linkage means further includes a plurality of washers coaxially disposed about said post member, selected ones of said washers being nonrotatably linked with said main gear and other of said washers being nonrotatably linked with said sleeve member, and said at least one bearing disposed between said washers.

9. The apparatus of claim 8, in which said drag means further includes wear-resistant material disposed between two or more of said main gear, said plurality of washers, and said at least one bearing.

10. In an apparatus for exerting a drag force on main gear means, the combination of: frame means having a post member disposed thereon; a sleeve member coaxially mounted and retained on said post member and rotatable thereon; main gear means coaxially mounted on said sleeve member and rotatable thereon; at least one bearing means radially disposed about said sleeve member and linked to said main gear means; and compressing means for exerting compressive force on said bearing means, said linkage between said bearing means and said main gear means being configured to translate said compressive force into drag force on said main gear means, and said linkage including at least one washer coaxially disposed about said post member, being nonrotatably linked with said sleeve member, and at least some of said at least one bearing means disposed between said at least one washer and said main gear.

11. The apparatus of claim 10, in which said linkage means further includes a plurality of said washers, selected ones of said washers being nonrotatably linked with said main gear means and other of said washers being nonrotatably linked with said sleeve member, and at least some of said one or more bearing means disposed between said washers.

12. The apparatus of claim 11, in which said apparatus further includes wear-resistant material disposed between two or more of said main gear, said plurality of washers, and said one or more bearing means.

* * * * *